(12) United States Patent
Xiaoyan

(10) Patent No.: US 12,530,224 B2
(45) Date of Patent: Jan. 20, 2026

(54) HIGH THROUGHPUT MACHINE LEARNING MODEL RUNTIME USING CPU AFFINITY AND PROCESS NICENESS CONTROL

(71) Applicant: SAP SE, Walldorf (DE)

(72) Inventor: Shi Xiaoyan, Singapore (SG)

(73) Assignee: SAP SE, Walldorf (DE)

( * ) Notice: Subject to any disclaimer, the term of this patent is extended or adjusted under 35 U.S.C. 154(b) by 1085 days.

(21) Appl. No.: 17/457,080

(22) Filed: Dec. 1, 2021

(65) Prior Publication Data

US 2023/0168922 A1 Jun. 1, 2023

(51) Int. Cl.
*G06F 9/46* (2006.01)
*G06F 9/48* (2006.01)
*G06N 20/00* (2019.01)

(52) U.S. Cl.
CPC ........... *G06F 9/4881* (2013.01); *G06N 20/00* (2019.01)

(58) Field of Classification Search
None
See application file for complete search history.

(56) References Cited

U.S. PATENT DOCUMENTS

| 7,401,112 | B1 * | 7/2008 | Matz | G06F 9/5038 |
| | | | | 718/103 |
| 2012/0054765 | A1 * | 3/2012 | Lee | G06F 9/5027 |
| | | | | 718/104 |
| 2021/0281662 | A1 * | 9/2021 | Mathur | G06N 20/00 |

OTHER PUBLICATIONS

Beisel et al., "Cooperative multitasking for heterogeneous accelerators in the linux completely fair scheduler." ASAP 2011-22nd IEEE International Conference on Application-specific Systems, Architectures and Processors. IEEE, Sep. 2011, 4 pages.
Bengio et al., "Towards biologically plausible deep learning." arXiv preprint arXiv:1502.04156, Feb. 2015, 10 pages.
Bishop, "Pattern recognition." Machine learning 128.9, Feb. 2006, 11 pages.
Kobus et al., "Completely Fair Scheduler and its tuning." draft on Internet, 2009, 8 pages.
Marblestone et al., "Toward an integration of deep learning and neuroscience." Frontiers in computational neuroscience 10, 94, Sep. 2016, 41 pages.
Mitchell, "Machine learning.", 1997, 870-877, 14 pages.
Olshausen et al., "Emergence of simple-cell receptive field properties by learning a sparse code for natural images." Nature 381.6583, Jun. 1996, 607-609, 3 pages.

(Continued)

*Primary Examiner* — Bing Zhao
(74) *Attorney, Agent, or Firm* — Fish & Richardson P.C.

(57) ABSTRACT

Methods, systems, and computer-readable storage media for receiving, by a request processing engine of the ML model runtime, an inference request associated with a version model (VM), and determining, by the request processing engine that a VM-specific token and a global token are available for the inference request, the VM-specific token being available from a token pool that is specific to the VM, and in response: selecting a VM process (VMP) in a set of VMPs for execution of the inference request, the VMP being executed by a processor that is different from one or more processors executing one or more other VMPs in the set of VMPs, each VMP in the set of VMPs being specific to the VM and being designated for execution by a respective processor by a respective affinity setting, and providing the inference request to the VMP for execution.

17 Claims, 6 Drawing Sheets

(56) References Cited

OTHER PUBLICATIONS

Provost et al., "Glossary of terms." Journal of Machine Learning 30.2-3, Feb. 1998, 271-274, 4 pages.
Simon, "Too big to ignore: the business case for big data" vol. 72. John Wiley & Sons, Mar. 2013, 242 pages.
Wong et al., "Fairness and interactive performance of O (1) and CFS Linux kernel schedulers." 2008 International Symposium on Information Technology. vol. 4. IEEE, Aug. 2008, 8 pages.
Wong et al., "Towards achieving fairness in the Linux scheduler." ACM SIGOPS Operating Systems Review 42.5, Jul. 2008, 34-43, 10 pages.

* cited by examiner

HIGH THROUGHPUT MACHINE LEARNING MODEL RUNTIME USING CPU AFFINITY AND PROCESS NICENESS CONTROL

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task).

During inference, ML models are executed in a ML model runtime to process incoming requests and provide output (e.g., predictions). Traditional ML model runtimes, however, have technical disadvantages. For example, some traditional ML model runtimes are not able to adjust and maximize throughput to meet a required throughput (e.g., contractually required through a service level agreement (SLA)). Further, some traditional ML model runtimes are absent rate limiting and can suffer from poor memory management as well as server hang-ups and/or crashes occurring due to random peak loads. In additional, some traditional ML model runtimes are inefficient in terms of CPU resources expended.

SUMMARY

Implementations of the present disclosure are directed to a runtime for execution of machine learning (ML) models. More particularly, implementations of the present disclosure are directed to a high throughput runtime for ML models using affinity and process niceness control.

In some implementations, actions include receiving, by a request processing engine of the ML model runtime, a first inference request associated with a first version model (VM), and determining, by the request processing engine that a VM-specific token and a global token are available for the first inference request, the VM-specific token being available from a token pool that is specific to the first VM, and in response: selecting a first VM process (VMP) in a first set of VMPs for execution of the first inference request, the first VMP being executed by a processor that is different from one or more processors executing one or more other VMPs in the first set of VMPs, each VMP in the first set of VMPs being specific to the first VM and being designated for execution by a respective processor by a respective affinity setting, and providing the first inference request to the first VMP for execution. Other implementations of this aspect include corresponding systems, apparatus, and computer programs, configured to perform the actions of the methods, encoded on computer storage devices.

These and other implementations can each optionally include one or more of the following features: the first VMP is associated with a niceness setting that prioritizes the first VMP for execution by the processor relative to a second VMP associated with a second VM that is also executed by the processor; the first VMP has a higher priority than the second VMP; a first processor executes the first VMP as a primary VMP of the first VM and a second processor executes a second VMP as a secondary VMP of the first VM; actions further include receiving, by the request processing engine of the ML model runtime, a second inference request associated with a second VM, determining, by the request processing engine that one or more of a VM-specific token and a global token are unavailable for the second inference request, and determining that a timeout has occurred for the second inference request and, in response, rejecting the second inference request; the global token is available from a global token pool; and each of the request processing engine and the VMPs in the first set of VMPs is executed by a respective processor.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
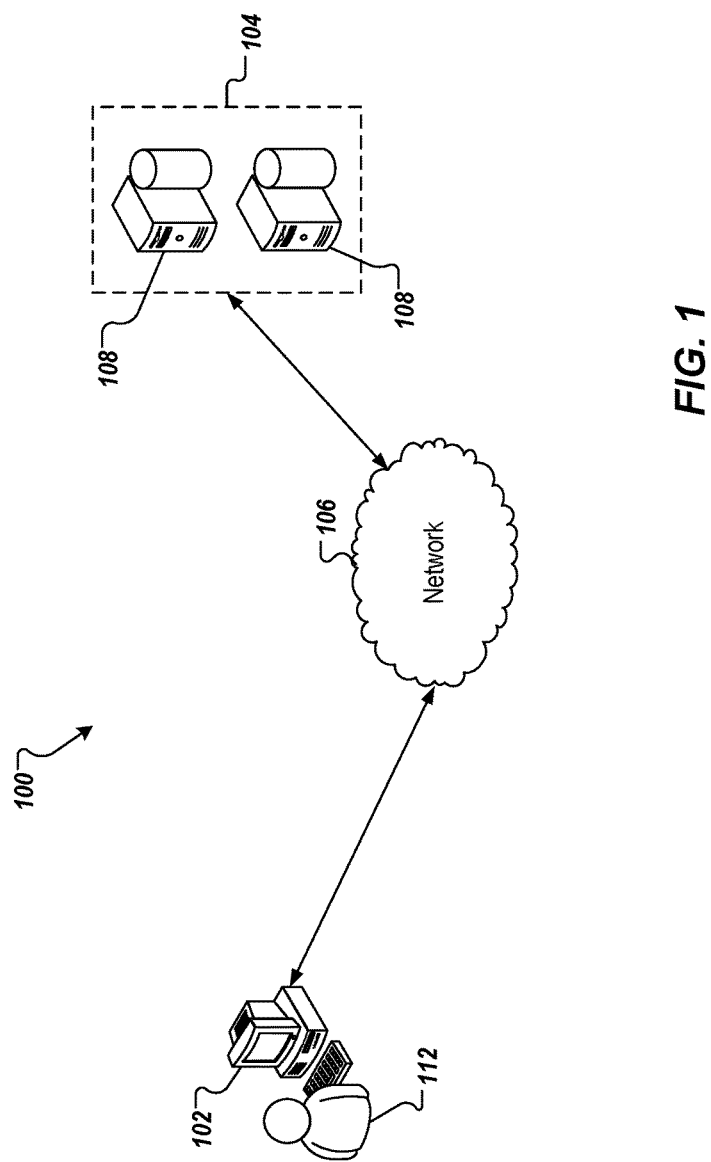
FIG. 1 depicts an example architecture that can be used to execute implementations of the present disclosure.

Implementations of the present disclosure are directed to a runtime for execution of machine learning (ML) models. More particularly, implementations of the present disclosure are directed to a high throughput runtime for ML models using affinity and process niceness control.

Implementations can include actions of receiving, by a request processing engine of the ML model runtime, an inference request associated with a version model (VM), and determining, by the request processing engine that a VM-specific token and a global token are available for the inference request, the VM-specific token being available from a token pool that is specific to the VM, and in response: selecting a VM process (VMP) in a set of VMPs for execution of the inference request, the VMP being executed by a processor that is different from one or more processors executing one or more other VMPs in the set of VMPs, each VMP in the set of VMPs being specific to the VM and being designated for execution by a respective processor by a respective affinity setting, and providing the inference request to the VMP for execution.

To provide further context for implementations of the present disclosure, and as introduced above, enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using ML systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task).

During inference, ML models are executed in a ML model runtime to process incoming requests and provide output (e.g., predictions). In general, a ML model runtime deals with the inference phase, taking the trained ML models and managing their lifecycles, with an aim to provide clients with managed, reliable, high performance, and user-friendly services. As such, ML model runtimes perform various tasks. For example, a ML model runtime serves a ML model (or multiple versions of the ML model), serves multiple homogeneous/heterogeneous ML models in an isolated manner using a set of out-of-the-box ML model loaders, provides inference services and management services through various protocols (e.g., representational state transfer (RESTful), g remote procedure call (gRPC), transmission control protocol (TCP)). Other example tasks include providing a self-responsive rate limiting umbrella, supporting batch inference to achieve better performance, and to support flexible pre-/post-processing through configurable pre-/post-processors.

Traditional ML model runtimes, however, have technical disadvantages. For example, a typical ML model runtime can be considered and can be executed in a Linux environment, which uses a default Linux CPU scheduling strategy SCHED_NORMAL (Completely Fair Scheduler (CFS)) that aims to maximize overall CPU utilization while also maximizing interactive performance. This approach, however, may not naturally provide the best result in a scenario, in which throughput is to be maximized with some acceptable performance compromise. For example, maximizing throughput to meet a required throughput (e.g., contractually required through a service level agreement (SLA)). Further, this approach is unable to achieve a generic responsive rate limiting due to the diversities of the ML models and variety in sizes and/or types of input payloads. In some instances, traditional approaches suffer from poor memory management that can frequently result in an out of memory (OOM) condition. Further, server hang-ups and/or crashes occur due to random peak loads.

Another issue is that traditional approaches are inefficient in terms of CPU resources. More particularly, traditional approaches constantly incur heavy, unnecessary CPU context switches, which wastes CPU resources. For example, in a traditional ML model runtime using a thread pool-based approach and the default CPU scheduling strategy, SCHED_NORMAL (CFS), threads take turns to utilize the CPU. Between threads, a context of a just-executed thread is saved, contexts are switched, and the context of a to-be-executed thread is restored and then the thread is executed. This, save-switch-restore process between threads results in inefficient use of the CPUs executing the threads.

In view of the above context, implementations of the present disclosure are directed to a generic ML model runtime that bootstraps ML models as reliable high-throughput services (e.g., RESTful service, gRPC service, TCP service) with relatively simple configurations. As described in further detail herein, the ML model runtime of the present disclosure addresses disadvantages of traditional approaches using a master-worker architecture and isolated-processes, in which the master and the workers are connected through a Unix Domain Socket (UDS) and a pulling strategy. Further, the ML model runtime of the present disclosure controls the CPU scheduling strategy by setting CPU affinities and niceness for the processes. In general, CPU affinity refers binding processes to one or more specified processors. In general, niceness refers to priority of a process relative to other processes executing on the same CPU (e.g., a niceness of −20 is the highest priority, a niceness of 19 is the lowest priority).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an inference service that uses ML models to provide inference results (e.g., predictions). For example, the server system 104 can receive inference requests from one or more clients (e.g., the client device 102, a server system) and can process the inference requests through one or more ML models to provide inference results. As described in further detail herein, the one or more ML models can be executed in the ML model runtime, which is hosted in the server system 104 to provision the inference service.

Figure 2:
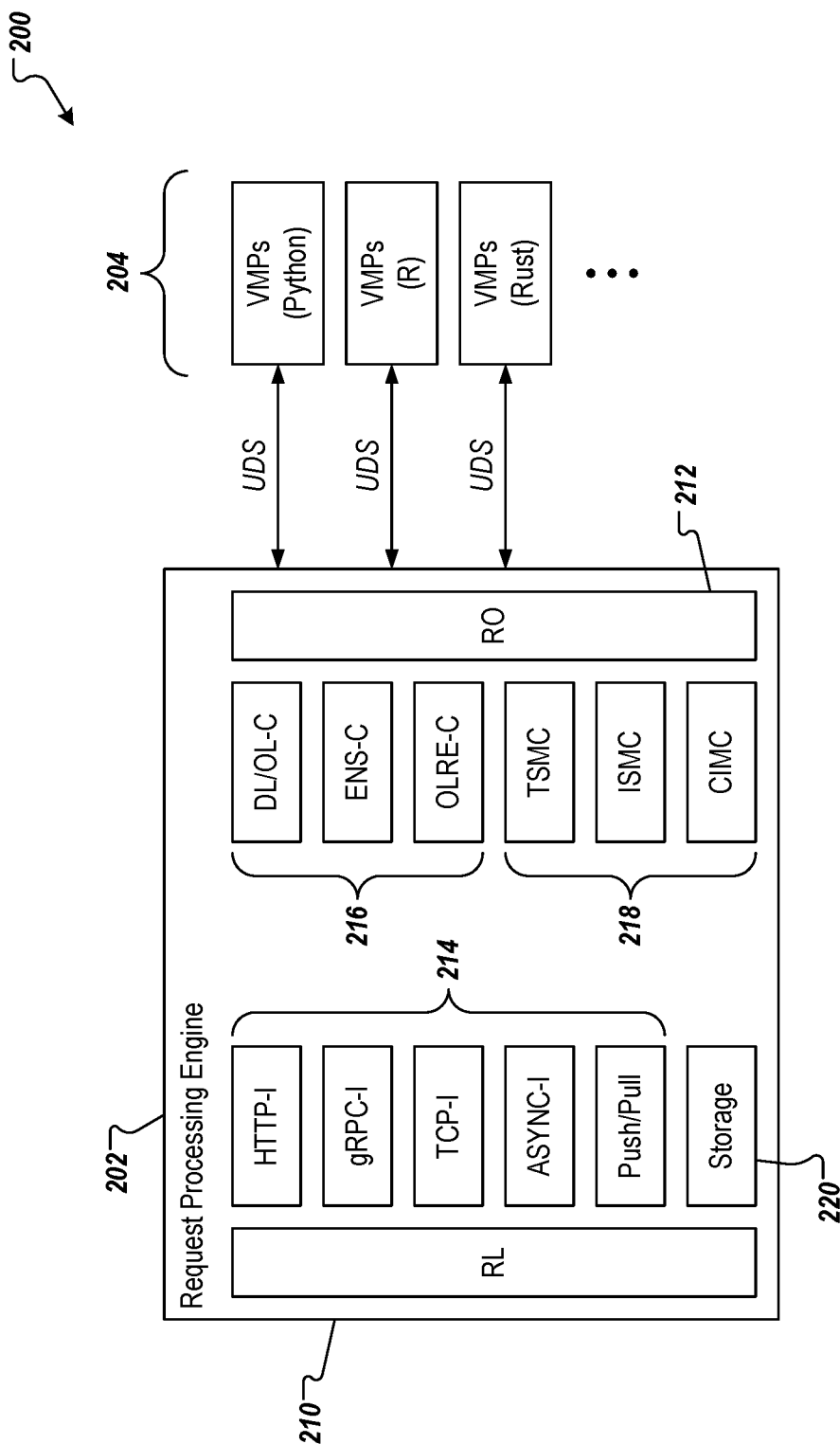
FIG. 2 depicts an example conceptual architecture of a machine learning (ML) model runtime in accordance with implementations of the present disclosure.

FIG. 2 depicts an example conceptual architecture 200 of a ML model runtime in accordance with implementations of the present disclosure. In the depicted example, the conceptual architecture 200 includes a request processing engine 202 and a set of versioned model processes (VMPs) 204. In some examples, the request processing engine 202 includes a rate limiting (RL) module 210, a request orchestrator (RO) module 212, a set of application programming interfaces (APIs) 214, a set of controllers 216, a set of collectors 218, and a storage engine 220.

In accordance with implementations of the present disclosure, and as described in further detail herein, the RL module 210 selectively admits incoming requests based on availability of VMPs in the set of VMPs 204 to process the requests. Further, the RO module 212 orchestrates processing of the requests with VMPs in the set of VMPs 204.

In the example of FIG. 2, the set of APIs 214 includes a hypertext transfer protocol (HTTP) inference API (e.g., RESTful API), a TCP inference API, an asynchronous (ASYNC) inference API, and a push/pull inference API. In general, each API in the set of APIs 214 enables a respective channel for inference requests to be received and inference results to be provided. In some examples, the push/pull API provides support for third-party/external application integrations. In some examples, the storage engine support asynchronous inference by, for example, caching inference results, caching ML models, and/or part of a peer-to-peer (P2P) caching network with other instances of the ML model runtime of the present disclosure.

In the example of FIG. 2, the set of controllers 216 includes a dynamic model loading/offloading (DL/OL) controller, an ensemble (ENS) controller, and an online retraining (OLRE) controller. In the example of FIG. 2, the set of collectors 218 includes a tracing-specific metrics (TSM) collector, an inference-specific metrics (ISM) collector, and a casual inference metrics (CIM) collector. In the example of FIG. 2, the set of VMPs 204 includes a Python model VMP, a R model VMP, and a Rust model VMP. While example VMPs are depicted, it is contemplated that the set of VMPs can include any appropriate VMP.

As described in further detail herein, the ML model runtime of the present disclosure isolates the request orchestrator and ML model workers as separate Linux processes. That is, and in the context of FIG. 2, the request processing engine 202, which includes the RO 212, and each of the VMPs in the set of VMPs 204 is a separate Linux process. For the VMPs, one Linux process is started on each CPU core for each of the versioned models (VMs). The ML model runtime of the present disclosure controls the CPU scheduling behaviors by setting the CPU affinity and niceness to reduce unnecessary CPU context switches. In some examples, the CPU affinities and niceness for the processes are established at startup.

In some implementations, each VMP in the set of VMPs 204 communicates with the request processing engine 202 through a UDS using a custom binary protocol. In some examples, each VMP pulls tasks from the request processing engine 202 on its own initiative. That is, instead of streaming (pushing) tasks to VMPs (workers), each VMP determines the best time for it to start a task. In this manner, performance of each VMP is optimized.

In further detail, and as noted above, each VMP communicates with the request processing engine 202 through UDS on a custom binary protocol. In some examples, this includes implementation of a set of binary instructions. For example, the VMP can send a signal (e.g., SIG_VMP_ASK_FOR_REQ) to the request processing engine 202 to indicate that the VMP has capacity to handle a new request/task. As another example, in the case of successfully completing a request/task, the VMP sends a signal (e.g., RESP_OK) with a set of attributes to the request processing engine 202 to indicate the request/task was successfully processed. As another example, the VMP sends a signal (e.g., RESP_ERR) with a set of attributes to the request processing engine 202 to indicate that the request/task failed to be processed. In some examples, the set of attributes indicates potential reasons for the failure. As still another example, the VMP sends a signal (e.g., METRICS) with a set of attributes to the request processing engine 202 to indicate report request/task execution metrics.

In some examples, the request processing engine 202 admits incoming requests based on task request signals received from VMPs in the set of VMPs 204. That is, instead of admitting all incoming requests, which could result in the server entering uncertain or dangerous states, the request processing engine 202 only admits incoming requests when VMPs are available to handle the requests. In this manner, the ML model runtime of the present disclosure provide for self-responsive rate limiting regardless of the diversity of the ML models and/or varieties of the size and/or type of payloads.

In accordance with implementations of the present disclosure, and as described in further detail herein, each VM is assigned two or more VMPs (workers) for execution of requests for the VM, with one VMP being designated as a primary for the VM and one VMP being designated as a secondary for the VM. Further, each VMP is assigned to a respective CPU in a set of CPUs. To achieve this, an affinity of a VMP is set to a CPU and an affinity of another VMP is set to another CPU. Further, respective niceness values are assigned to each VMP for its respective CPU to prioritize the VMP with respect to other VMPs executed by the CPU. In accordance with implementations of the present disclosure, each request for a respective VM is preferentially picked up by its primary VMP due to the primary VMP's niceness value. In this manner, unnecessary CPU context switches are avoided, significantly reducing the number of context switches occurring, and thus the burden on the CPUs.

Figure 3:
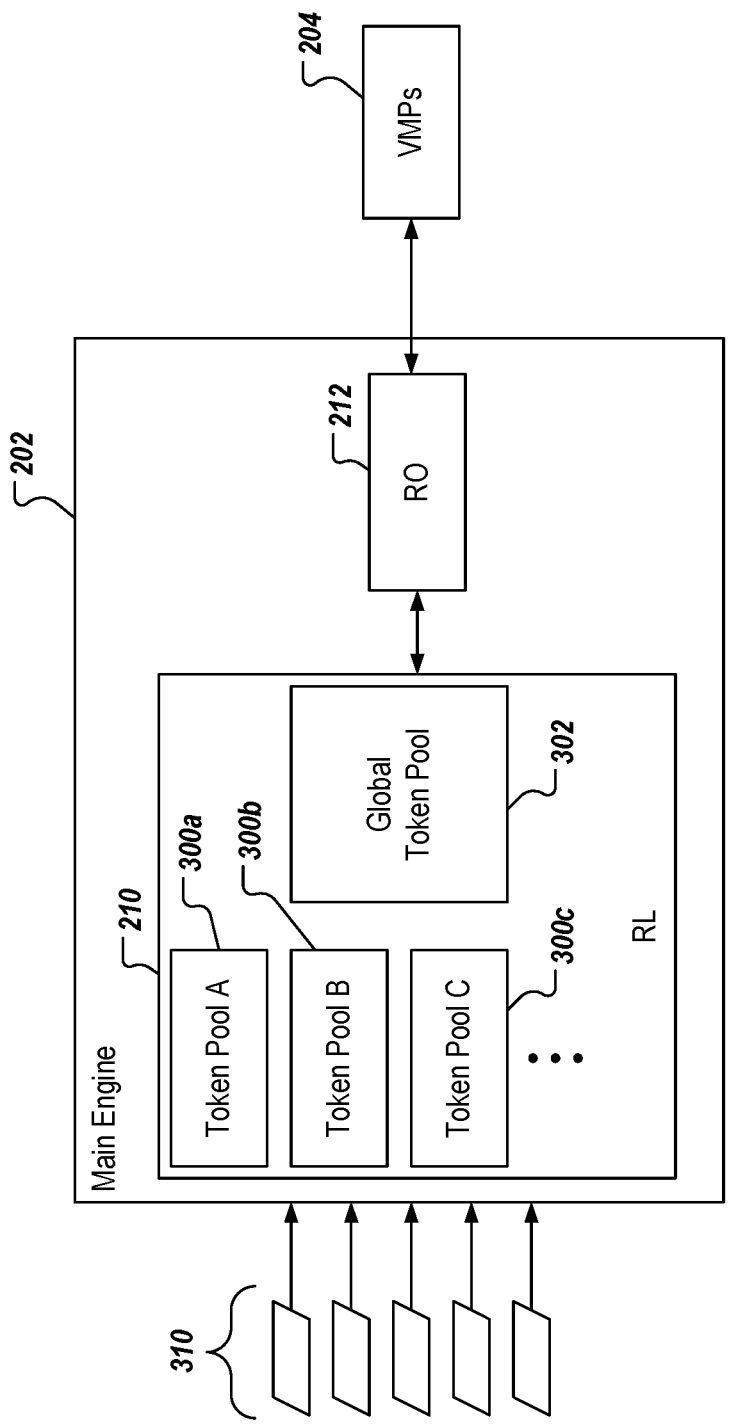
FIG. 3 depicts a representation of request processing through the request processing engine of FIG. 2 in accordance with implementations of the present disclosure.

FIG. 3 depicts a representation of request processing through the request processing engine 202 of FIG. 2 in accordance with implementations of the present disclosure. As depicted in FIG. 3, the request processing engine 202 maintains a multi-level token pool, which is initialized on startup based on planning of the VMPs. In the example of FIG. 3, the multi-level token pool includes VM-specific token pools 300a, 300b, 300c and a global token pool 302. That is, a VM-specific token pool 300a, 300b, 300c is provided for each VM and the global token pool 300 is provided for all VMs.

In some implementations, a set of VM-specific tokens is provided in each VM-specific token pool 300a, 300b, 300c. In some examples, a number of VM-specific tokens in a set of VM-specific tokens is set to a fixed value. For example, and without limitation, for each VM, the set of VM-specific tokens can be initialized to include four (4) VM-specific tokens. In some examples, a set of global tokens is provided in the global token pool 302. In some examples, a number of global tokens in the set of global tokens is based on a number of VM-specific tokens across all sets of VM-specific tokens. For example, and without limitation, the number of global tokens can be calculated as the same number of tokens as the VM-specific token pool having the highest (maximum) number of tokens. For purposes of illustration, and by way of non-limiting example, the VM-specific token pool 300a, the VM-specific token pool 300b, and the VM-specific token pool 300c can each include 4 VM-specific tokens. Consequently, and continuing with the non-limiting example, the global token pool can include 4 global tokens.

In some implementations, the RL module 210 enforces a set of rules to selectively admit incoming requests in a set of incoming requests 310 to the RO module 212 for processing. Each incoming request is associated with a respective VM (e.g., the request includes metadata indicating the VM). In some examples, the set of rules is provided as:
1) In order to be admitted, a request must first obtain a VM-specific token from its corresponding VM-specific token pool. If no VM-specific token is available, the request must wait until a VM-specific token becomes available, or a timeout condition occurs.
2) If the request obtains a VM-specific token, the request must next obtain a global token. If no global token is available, the request must wait until a global token becomes available, or a timeout condition occurs.
3) The ML model runtime does nothing for a request until the request obtains both a VM-specific token and a global token.
4) If the timeout condition occurs, the request is rejected. The timeout condition can include a pre-defined time expiring after the request is received, but before the request obtains both a VM-specific token and a global token.

In accordance with implementations of the present disclosure, if the request obtains both a VM-specific token and a global token, the request is admitted to the RO module 212 for processing. That is, for example, the RO module 212 transmits the request to an available VMP (designated for the VM that the request is associated with). After the request is processed and the result returned, the global token is returned to the global token pool 302 and the VM-specific token is returned to the corresponding VM-specific token pool 300a, 300b, 300c.

In some examples, in a synchronous approach, if a request is rejected, an error response is immediately sent to client that had originally submitted the request. In some examples, the error response indicates that the request failed to process, potential reasons for failure, and an error code. The client can determine whether to re-try the request or otherwise run error handling logic at the client. In some examples, in asynchronous approach, an error response with potential reasons and error code are persisted to a storage service. Clients can retrieve error responses as needed.

In some implementations, upon start-up, the ML model runtime initializes and executes planning of VMPs, which includes how many VMPs should be started for each VM, respectively, which CPU core(s) a VMP should be bound to (by affinity setting), and what niceness value should be assigned to each VMP for a respective CPU. In some examples, the ML model runtime executes a built-in algorithm to check the number of available CPU cores, the available memory, whether there is a graphics processing unit (GPU) and/or other accelerator devices available. The ML model runtime makes a joint consideration as to how many VMs a user has configured and the types/nature of the configured VMs. The ML model runtime generates a set of configurations that are executed to configure the VMPs. In some examples, the ML model runtime enables users to fully control each aspect of the configurations. For example, if a user has run experiments and knows, with this scale of resources, that a particular set of configurations works the best, then the user can directly provide the set of configurations to the ML model runtime for execution.

Implementations of the present disclosure are described in further detail herein with reference to an example scenario. The example scenario includes inference using two versioned models (VM_a, VM_b) and three CPU cores (CPU [0, 1, 2]) to process four incoming requests provided as request_1 and request_2 for VM_a and request_3 and request_4 for VM_b. It is contemplated, however, that the ML model runtime of the present disclosure can be used to execute any appropriate scenario.

Figure 4A:
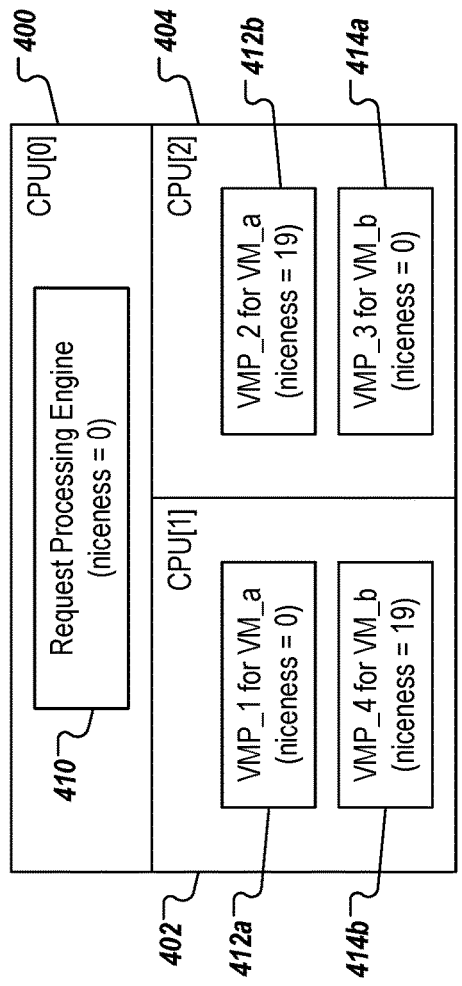
FIG. 4A depicts an example topological graph to illustrate implementations of the present disclosure.

FIG. 4A depicts an example topological graph 400 to illustrate implementations of the present disclosure. The topological graph 400 of FIG. 4 represents the example scenario introduced above. In further detail, the topological graph 400 depicts that the request processing engine (e.g., the request processing engine 202 of FIG. 2) is executed as a Linux process 410 on CPU[0] with a niceness of 0, a first VMP (VMP_1) for VM_a is executed as a Linux process 412a on CPU[1] with a niceness of 0, a second VMP (VMP_2) for VM_a is executed as a Linux process 412b on CPU[2] with a niceness of 19, a third VMP (VMP_3) for VM_b is executed as a Linux process 414a on CPU[2] with a niceness of 0, and a fourth VMP (VMP_4) for VM_b is executed as a Linux process 414b on CPU[1] with a niceness of 19.

In this example, at startup, the ML model runtime allocates a fixed amount of tokens in a VM_a-specific token pool, a VM_b-specific token pool, and a global token pool. In some examples, tokens are allocated based on the following relationships:

$$TP_{VM\_a}=2*n_{VMP\text{-}VM_a}=4$$

$$TP_{VM\_b}=2*n_{VMP\text{-}VM_b}=4$$

$$TP_{global}=\text{MAX}\{TP_{VM\_a}, TP_{VM\_b}\}=4$$

where $TP_{VM\_a}$ is the number of tokens allocated to the VM_a-specific token pool, $TP_{VM\_b}$ is the number of tokens allocated to the VM_b-specific token pool, $TP_{global}$ is the number of tokens allocated to the global token pool, $n_{VMP\text{-}VM_a}$ is the number of VMPs for VM_a, and $n_{VMP\text{-}VM_b}$ is the number of VMPs for VM_b.

In this example, VMP_1 on CPU[1] is a primary process for VM_a and VMP_2 is a secondary process for VM_a on CPU[2]. Similarly, VMP_3 on CPU[2] is a primary process for VM_b and VMP_4 is a secondary process for VM_b on CPU[1]. In this example, CPU[1] is a primary CPU for VM_a and is a secondary CPU for VM_b, while CPU[2] is a primary CPU for VM_b and is a secondary CPU for VM_a. To achieve this, an affinity of VMP_1 is set to CPU[1], an affinity for VMP_4 is set to CPU[1], an affinity for VMP_2 is set to CPU[2], and an affinity for VMP_3 is set to CPU[2]. Further, as a result of the respective niceness values, VMP_1 has a higher priority on CPU[1] than VMP_4, and VMP_3 has a higher priority on CPU[2] than VMP_2. Accordingly, each request for VM_a is preferentially picked up by VMP_1 due to VMP_1's low niceness value, and each request for VM_b is preferentially picked up by VMP_3 due to VMP_3's low niceness value. In this manner, unnecessary CPU context switches are avoided, significantly reducing the number of context switches occurring, and thus the burden on the CPUs.

Figure 4B:
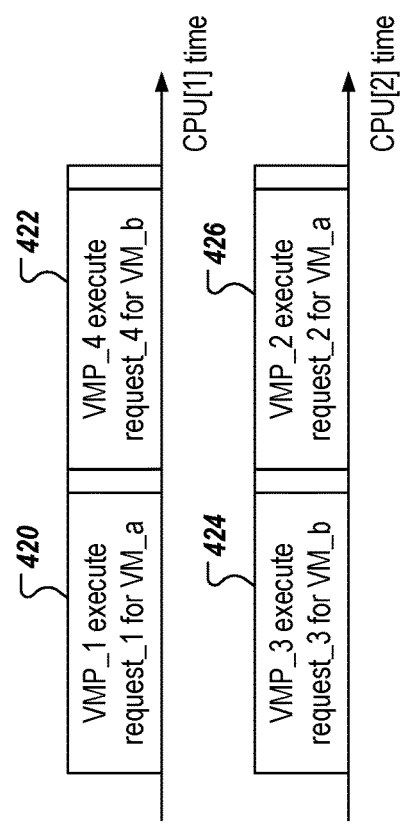
FIG. 4B depicts example scheduling in accordance with implementations of the present disclosure.

FIG. 4B depicts example scheduling in accordance with implementations of the present disclosure. In the example of FIG. 4B, a first request 420 (request_1 for VM_a) is executed on CPU[1] followed by a second request 422 (request_4 for VM_b) being executed on CPU[1]. Similarly, a third request 424 (request_3 for VM_b) is executed on CPU[2] followed by a fourth request 426 (request_2 for VM_a) being executed on CPU[2]. The example scheduling of FIG. 4B represents that CPU utilization of the requests 420, 422, 424, 426 is executed in a controlled manner to reduce the number of context switches, as described herein.

In accordance with implementations of the present disclosure, and continuing with the example scenario, the RL module initializes a VM_a token pool having, for example, 4 VM_a tokens, a VM_b token pool having, for example, 4 VM_b tokens, and a global token pool having 4 global tokens. In response to receiving request_1, a VM_a token and a global token are obtained by request_1, and request_1 is admitted to the RO module for processing. At this point, the VM_a token pool includes 3 VM_a tokens and the global token pool includes 3 global tokens. In response to receiving request_3, a VM_b token and a global token are obtained by request_3, and request_3 is admitted to the RO module for processing. At this point, the VM_b token pool includes 3 VM_b tokens and the global token pool includes 2 global tokens. After request_1 is completed, its VM_a token and global token are returned to the VM_a token pool and the global token pool, respectively. At this point, the VM_a token pool includes 4 VM_a tokens and the global token pool includes 3 global tokens.

In response to receiving request_4, a VM_b token and a global token are obtained by request_4, and request_4 is admitted to the RO module for processing. At this point, the VM_b token pool includes 2 VM_b tokens and the global token pool includes 2 global tokens. After request_3 is completed, its VM_b token and global token are returned to the VM_b token pool and the global token pool, respectively. At this point, the VM_b token pool includes 3 VM_b tokens and the global token pool includes 3 global tokens. In response to receiving request_2, a VM_a token and a global token are obtained by request_2, and request_2 is admitted to the RO module for processing. At this point, the VM_a token pool includes 2 VM_a tokens and the global token pool includes 2 global tokens.

After request_4 is completed, its VM_b token and global token are returned to the VM_b token pool and the global token pool, respectively. At this point, the VM_b token pool includes 4 VM_b tokens and the global token pool includes 3 global tokens. After request_2 is completed, its VM_a token and global token are returned to the VM_a token pool and the global token pool, respectively. At this point, the VM_a token pool includes 4 VM_a tokens and the global token pool includes 4 global tokens.

Figure 5:
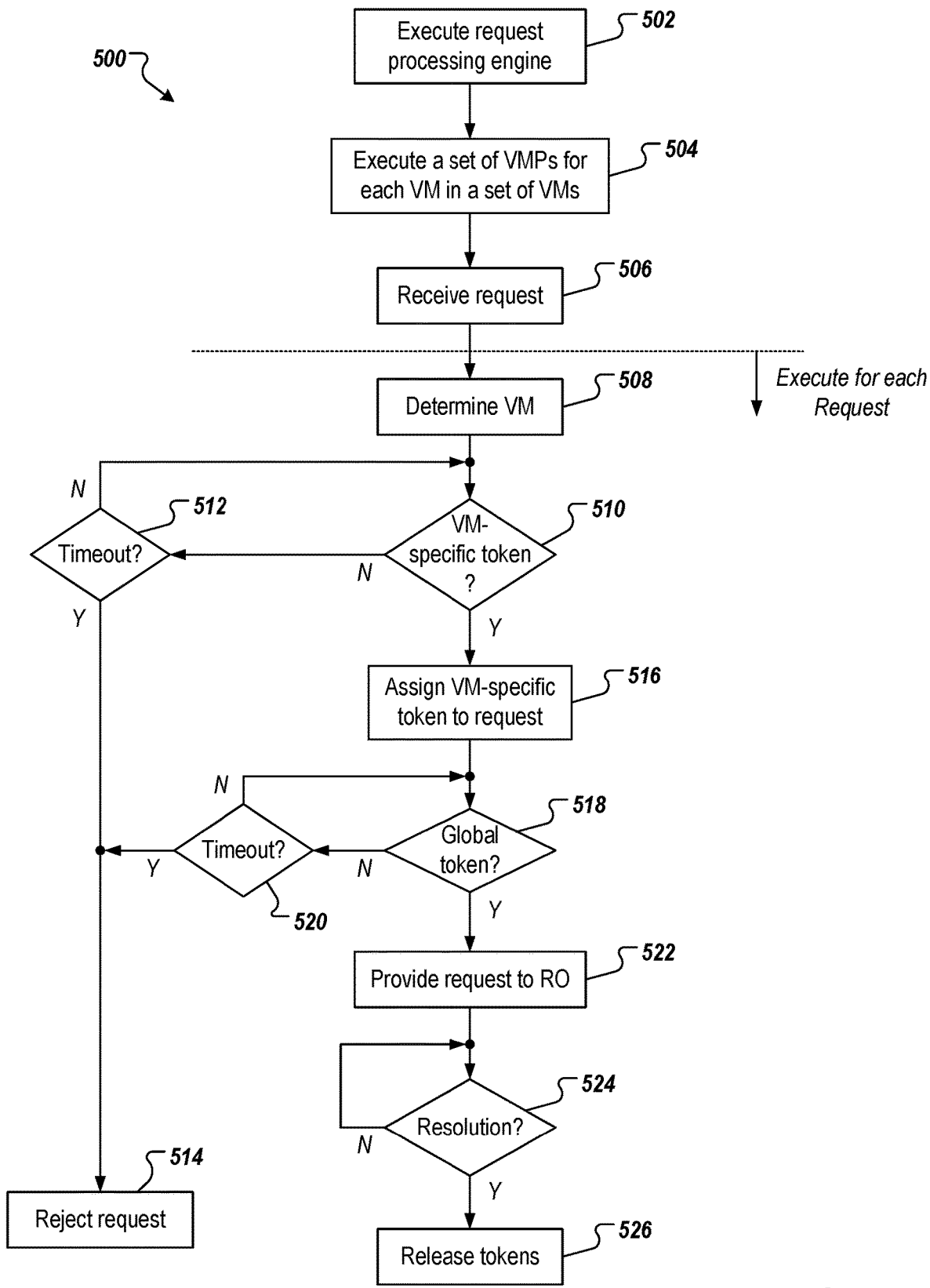
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A request processing engine is executed (502) and a set of VMPs for each VM in a set of VMs is executed (504). For example, and as described herein with reference to FIG. 2, the request processing engine 202 is executed as a process (e.g., Linux process) and each of the VMPs in the set of VMPs 204 is executed as a process (e.g., Linux process) on respective CPUs. For example, and with reference to FIG. 4A, the request processing engine is executed as the Linux process 410 on CPU[0], the first VMP (VMP_1) for VM_a is executed as the Linux process 412*a* on CPU[1] with a niceness of 0, the second VMP (VMP_2) for VM_a is executed as the Linux process 412*b* on CPU[2], the third VMP (VMP_3) for VM_b is executed as the Linux process 414*a* on CPU[2] with, and the fourth VMP (VMP_4) for VM_b is executed as the Linux process 414*b* on CPU[1]. In some examples, this is achieved by setting an affinity of the Linux process 410 (i.e., the request processing engine) to CPU[0], affinities of the Linux processes 412*a*, 414*b* (i.e., VMP_1, VMP_4, respectively) to CPU[1], and affinities of the Linux processes 412*b*, 414*a* (i.e., VMP_2, VMP_3, respectively) to CPU[2].

A request is received (506). For example, and as described herein, a request for inference by a VM is received by the request processing engine 202 through a channel (e.g., RESTful, gRPC, TCP). In some examples, the request processing engine 202 receives multiple requests. Further discussion of the example process 500 of FIG. 5 is with respect to each request that is received by the request processing engine 202.

A VM corresponding to the request is determined (508). For example, and as described herein, the request can include metadata that indicates a particular VM that the request is submitted for (e.g., VM_a, VM_b). It is determined whether a VM-specific token is available for the request (510). For example, and as described herein with reference to FIG. 3, each VM includes an associated VM-specific token pool 300*a*, 300*b*, 300*c*. In some examples, the RL module 210 determines whether the VM-specific token pool of the VM associated with the request includes any available VM-specific tokens. If a VM-specific token is not available for the request, it is determined whether a timeout has occurred (512). For example, and as described herein, a timeout timer for the request can be initiated upon the request being received by the RL model 210. If the timeout timer meets or exceeds a threshold time (e.g., 1 s, 3 s) before the request is assigned both a VM-specific token and a global token, a timeout condition occurs for the request. If a timeout has occurred, the request is rejected (514). If a timeout has not occurred, the example process 500 loops back.

If a VM-specific token is available, the VM-specific token is assigned to the request (516). For example, and as described herein, a VM-specific token is taken from the VM-specific token pool and as associated with the request. It is determined whether a global token is available for the request (518). For example, and as described herein, the RL module 210 maintains a global token pool 302 that provides a limited set of global tokens for all VMs. If a global token is not available for the request, it is determined whether a timeout has occurred (520). If a timeout has occurred, the request is rejected (514). If a timeout has not occurred, the example process 500 loops back.

If a global token is available, the global token is assigned to the request and the request is provided to the RO (522). For example, and as described herein, a global token is taken from the global token pool and as associated with the request. At this point, the request includes both a VM-specific token and a global token and, as a result, the request is provided to the RO module 212 by the RL module 210 for processing. It is determined whether the request is resolved (524). For example, and as described herein, the RO module 212 provides the request to a VMP of the VM that the request is associated with. For example, and with reference to FIGS. 4A, a request for VM_a can be sent to VMP_1 of VMP_2, depending on the availability of CPU[1] and CPU [2], respectively, to process the request. As discussed herein, CPU[1] prioritizes requests for VM_a over requests for other VMs as a consequence of the niceness (e.g., niceness=0) of VMP_1 on CPU[1], while CPU[2] has a lower priority for requests for VM_a over requests for other VMs as a consequence of the niceness (e.g., niceness=19) of VMP_2 on CPU[2]. In some examples, resolution of a request can include success, failure, or timeout. That is, for example, the VMP can successfully process the request and provided an inference response. As another example, the VMP can fail by unsuccessfully processing the request being unable to provide an inference result. As still another example, processing of a request can be associated with a timeout that provides a specified period of time that a VMP has to process the request. If the VMP does not process the request (e.g., success, failure) within the specified period of time, a timeout occurs.

If the request is not resolved, the example process 500 loops back. If the request is resolved, the VM-specific token and the global token are released (526). For example, and as described herein, upon completion of a request, the VMP tasked with the request returns a response to the RO module 212, which response is then returned to the client that had submitted the request. Further, the VM-specific token and the global specific token that had been assigned to the request are returned back to the respective token pools to be available for other requests.

Implementations of the present disclosure were evaluated against a set of traditional ML model runtimes using a set of payloads processed by a ML model. The ML model was selected as inception_v1. For a fair comparison in the evaluation, ML models were run inside Docker containers on an Amazon Web Services (AWS) m5.4xlarge instance with exactly the same resource constraints. The Docker container resource constraints were provided as cpus="3"|memory="4g"|memory-swap=-1. An attacked tool vegeta was used. The set of traditional ML model runtimes included Tensorflow serving 1.15.0 and Tensorflow serving 2.7.0. The set of payloads includes a 208 kB payload (tfl_inception_208.0kb_col.json) and a 2.3 MB payload (tfl_inception_2.3mb_col.json). For each ML model runtime and payload, an average maximum requests per second (RPS) value was determined using multiple timeout conditions, namely timeout=1 s and timeout=3 s.

For the 208 kB payload and timeout=1 s, the ML model runtime of the present disclosure achieved a maximum RPS of 20.56, while Tensorflow serving 2.7.0 achieved a maximum RPS of 8.49, and Tensorflow serving 1.15.0 achieved a maximum RPS of 8.39. For the 208 kB payload and timeout=3 s, the ML model runtime of the present disclosure achieved a maximum RPS of 20.85, while Tensorflow serving 2.7.0 achieved a maximum RPS of 8.57, and Tensorflow serving 1.15.0 achieved a maximum RPS of 8.46. Accordingly, the ML model runtime of the present disclosure provides an approximately 142% improvement over Tensorflow serving 2.7.0 and an approximately 145% improvement over Tensorflow serving 1.15.0 in terms of average maximum RPS (averaged for the 1 s and 3 s timeouts) for the 208 kB payload.

For the 2.3 MB payload and timeout=1 s, the ML model runtime of the present disclosure achieved a maximum RPS of 7.28, while Tensorflow serving 2.7.0 achieved a maximum RPS of 4.2, and Tensorflow serving 1.15.0 achieved a maximum RPS of 4.1. For the 2.3 MB payload and timeout=3 s, the ML model runtime of the present disclosure achieved a maximum RPS of 7.31, while Tensorflow serving 2.7.0 achieved a maximum RPS of 4.19, and Tensorflow serving 1.15.0 achieved a maximum RPS of 4.1. Accordingly, the ML model runtime of the present disclosure provides an approximately 73% improvement over Tensorflow serving 2.7.0 and an approximately 77% improvement over Tensorflow serving 1.15.0 in terms of average maximum RPS (averaged for the 1 s and 3 s timeouts) for the 2.3 MB payload.

The evaluation further applied peak loads including a RPS of 30, a RPS of 100, and a RPS of 1000. For each of the peak loads, both Tensorflow serving 1.15.0 and Tensorflow serving 2.7.0 crashed, while the ML model runtime of the present disclosure achieved request success rates of 0.48%, 0.11%, and 0.01%, respectively.

In addition to example tasks discussed above, the ML model runtime of the present disclosure exposes tracing metrics for debugging, exposes ML-specific metrics to provide insight into ML model performance in a production environment, support asynchronous inference to handle non-real-time or long-running inferences, support A/B testing to provide insight into different versions of ML models, supports ML model ensembles to handle compositionally complex inference scenarios, and supports dynamic loading/offloading of a versioned ML model to enable a new version of the ML model to be brought online or to deprecate an old version of the ML model with zero downtime. Other example tasks that the ML model runtime of the present disclosure achieves include supporting ML model caching to accelerate startup, supporting automated hardware-specific ML model optimization to boost performance, supporting online retraining with the real custom payloads to evolve the ML models, supporting casual inference to provide insights into evolution of ML models, enabling inference results to be actively pushed to third-party/external system, and supporting ML feature store interactions.

Figure 6:
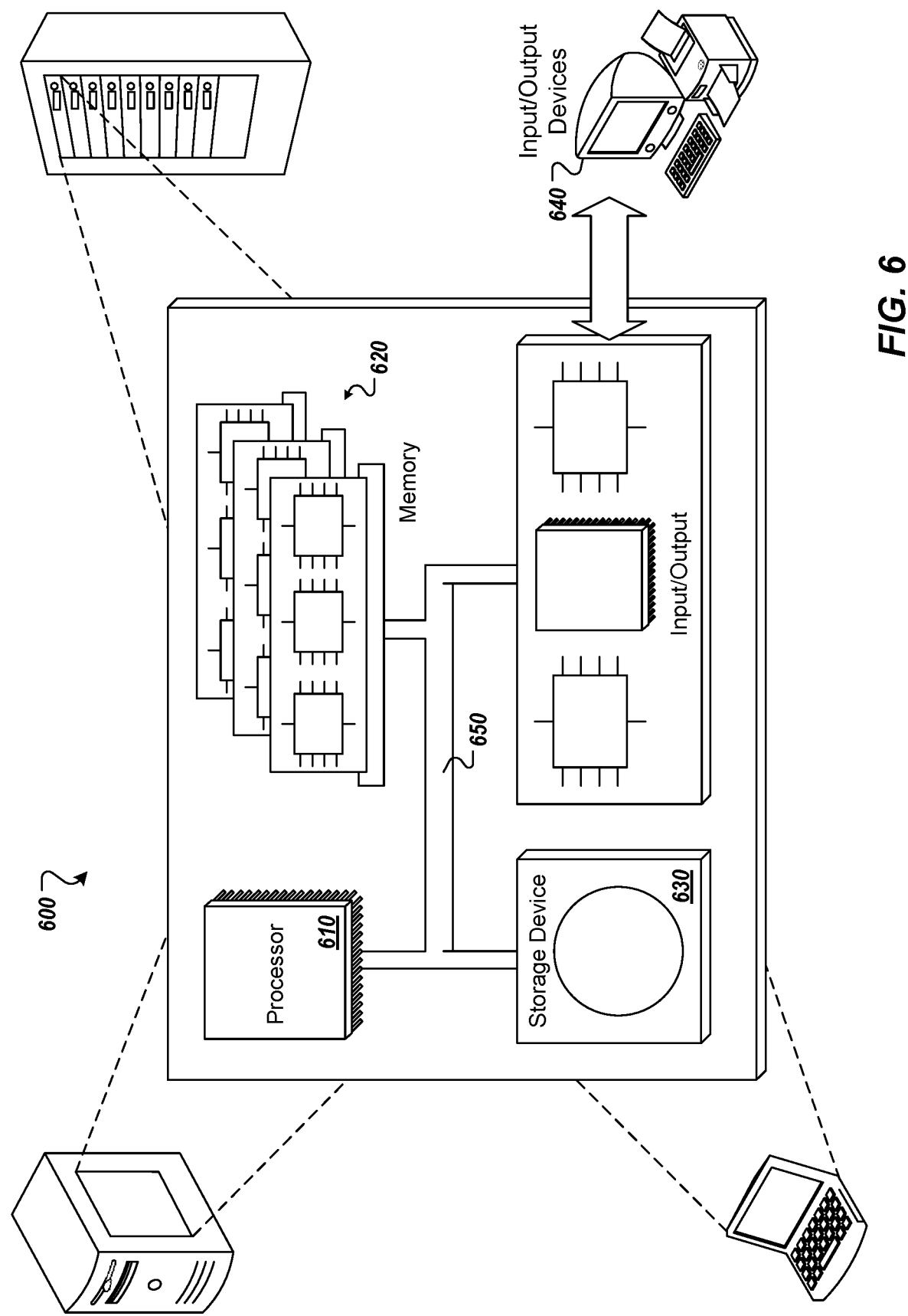
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for processing inference requests through a machine learning (ML) model runtime, the method being executed by one or more processors and comprising:
receiving, by a request processing engine of the ML model runtime, a first inference request associated with a first version model (VM); and
determining, by the request processing engine that a VM-specific token and a global token are available for the first inference request, the VM-specific token being available from a token pool that is specific to the first VM, and in response:
removing the VM-specific token and the global token, selecting a first VM process (VMP) in a first set of VMPs for execution of the first inference request, the first VMP being executed by a processor that is different from one or more processors executing one or more other VMPs in the first set of VMPs, each VMP in the first set of VMPs being specific to the first VM and being designated for execution by a respective processor by a respective affinity setting, and providing the first inference request to the first VMP for execution,
wherein, based on a niceness setting and the affinity setting of each VMP in the first set of VMPs, a first processor executes the first VMP as a primary VMP of the first VM and a second processor executes a second VMP as a secondary VMP of the first VM.

2. The method of claim 1, wherein the first VMP is associated with the niceness setting that prioritizes the first VMP for execution by the first processor relative to the second VMP.

3. The method of claim 2, wherein the first VMP has a higher priority than the second VMP.

4. The method of claim 1, further comprising:
receiving, by the request processing engine of the ML model runtime, a second inference request associated with a second VM;
determining, by the request processing engine that one or more of a VM-specific token and a global token are unavailable for the second inference request; and determining that a timeout has occurred for the second inference request and, in response, rejecting the second inference request.

5. The method of claim 1, wherein the global token is available from a global token pool.

6. The method of claim 1, wherein each of the request processing engine and the VMPs in the first set of VMPs is executed by a respective processor.

7. A non-transitory computer-readable storage medium coupled to one or more processors and having instructions stored thereon which, when executed by the one or more processors, cause the one or more processors to perform operations for processing inference requests through a machine learning (ML) model runtime, the operations comprising:
receiving, by a request processing engine of the ML model runtime, a first inference request associated with a first version model (VM); and
determining, by the request processing engine that a VM-specific token and a global token are available for the first inference request, the VM-specific token being available from a token pool that is specific to the first VM, and in response:
removing the VM-specific token and the global token,
selecting a first VM process (VMP) in a first set of VMPs for execution of the first inference request, the first VMP being executed by a processor that is different from one or more processors executing one or more other VMPs in the first set of VMPs, each VMP in the first set of VMPs being specific to the first VM and being designated for execution by a respective processor by a respective affinity setting, and
providing the first inference request to the first VMP for execution,
wherein, based on a niceness setting and the affinity setting of each VMP in the first set of VMPs, a first processor executes the first VMP as a primary VMP of the first VM and a second processor executes a second VMP as a secondary VMP of the first VM.

8. The non-transitory computer-readable storage medium of claim 7, wherein the first VMP is associated with the niceness setting that prioritizes the first VMP for execution by the first processor relative to the second VMP.

9. The non-transitory computer-readable storage medium of claim 8, wherein the first VMP has a higher priority than the second VMP.

10. The non-transitory computer-readable storage medium of claim 7, wherein operations further comprise:
receiving, by the request processing engine of the ML model runtime, a second inference request associated with a second VM;
determining, by the request processing engine that one or more of a VM-specific token and a global token are unavailable for the second inference request; and
determining that a timeout has occurred for the second inference request and, in response, rejecting the second inference request.

11. The non-transitory computer-readable storage medium of claim 7, wherein the global token is available from a global token pool.

12. The non-transitory computer-readable storage medium of claim 7, wherein each of the request processing engine and the VMPs in the first set of VMPs is executed by a respective processor.

13. A system, comprising:
a computing device; and
a computer-readable storage device coupled to the computing device and having instructions stored thereon which, when executed by the computing device, cause the computing device to perform operations for processing inference requests through a machine learning (ML) model runtime, the operations comprising:
receiving, by a request processing engine of the ML model runtime, a first inference request associated with a first version model (VM); and
determining, by the request processing engine that a VM-specific token and a global token are available for the first inference request, the VM-specific token being available from a token pool that is specific to the first VM, and in response:
removing the VM-specific token and the global token,
selecting a first VM process (VMP) in a first set of VMPs for execution of the first inference request, the first VMP being executed by a processor that is different from one or more processors executing one or more other VMPs in the first set of VMPs, each VMP in the first set of VMPs being specific to the first VM and being designated for execution by a respective processor by a respective affinity setting, and
providing the first inference request to the first VMP for execution,
wherein, based on a niceness setting and the affinity setting of each VMP in the first set of VMPs, a first processor executes the first VMP as a primary VMP of the first VM and a second processor executes a second VMP as a secondary VMP of the first VM.

14. The system of claim 13, wherein the first VMP is associated with the niceness setting that prioritizes the first VMP for execution by the first processor relative to the second VMP.

15. The system of claim 13, wherein the first VMP has a higher priority than the second VMP.

16. The system of claim 13, wherein operations further comprise:
receiving, by the request processing engine of the ML model runtime, a second inference request associated with a second VM;
determining, by the request processing engine that one or more of a VM-specific token and a global token are unavailable for the second inference request; and
determining that a timeout has occurred for the second inference request and, in response, rejecting the second inference request.

17. The system of claim 13, wherein the global token is available from a global token pool.

* * * * *